UNITED STATES PATENT OFFICE.

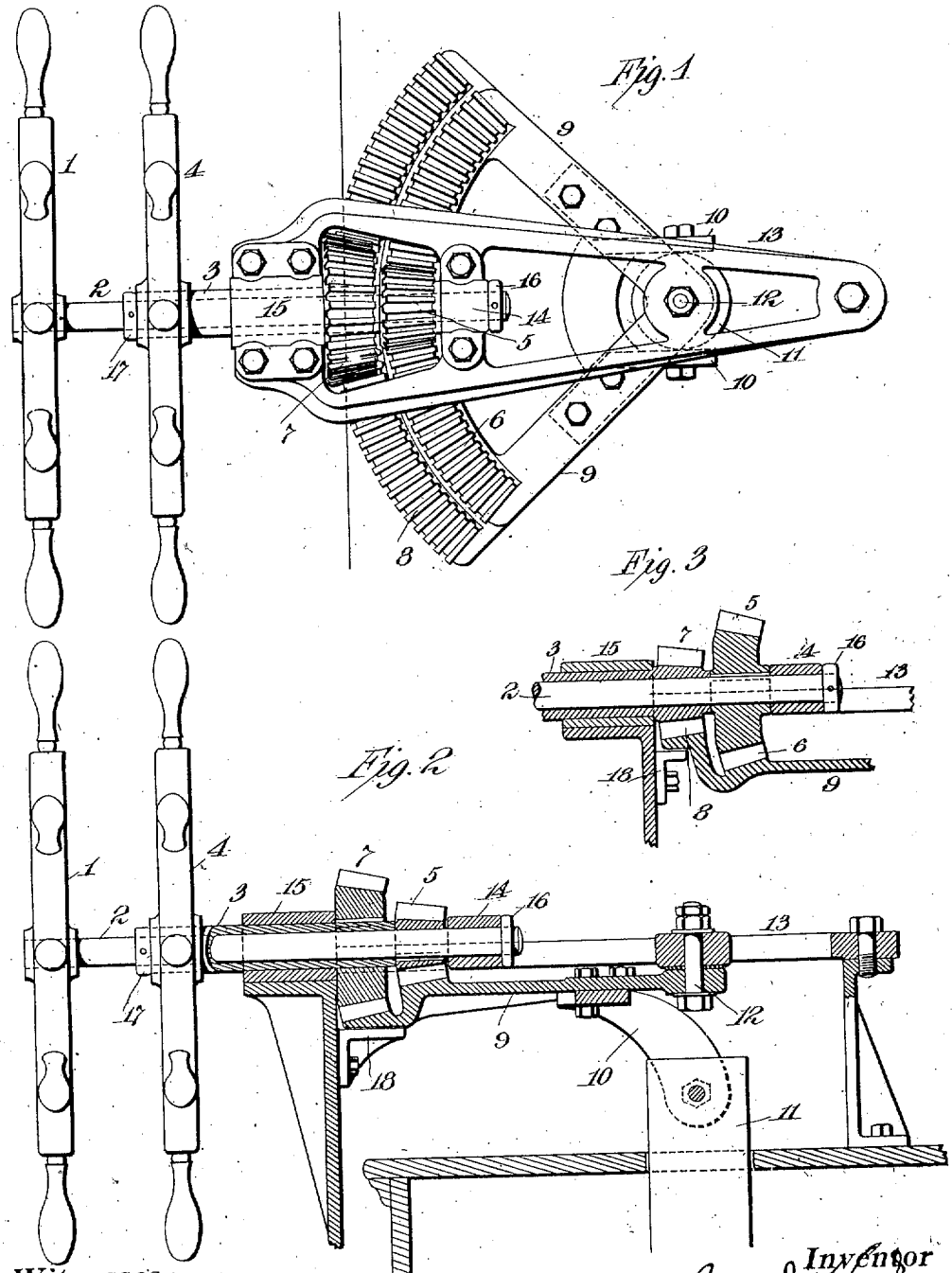

LEONARD H. DYER, OF EAST ORANGE, NEW JERSEY.

STEERING-GEAR.

No. 850,145.  Specification of Letters Patent.  Patented April 16, 1907.

Application filed January 9, 1905. Serial No. 240,192.

*To all whom it may concern:*

Be it known that I, LEONARD H. DYER, a citizen of the United States, residing in East Orange, county of Essex, State of New Jersey, have invented certain new and useful Improvements in Steering-Gear, of which the following is a specification.

The object I have in view is the production of a change-speed gearing for steering vessels or vehicles, but particularly the former, in which the change from speed to power, or vice versa, may be readily and surely effected and without the use of sliding or shift gearings or clutches. I attain these objects by the mechanism illustrated in the accompanying drawings, which show one embodiment of my invention, and in which—

Figure 1 is a top view of a steering-gear of simple form. Fig. 2 is a side view, partially in section, taken on the lines 2 2 of Fig. 1; and Fig. 3 is a detail view of a modification.

In the views like parts are designated by the same reference characters.

In carrying out my invention I provide a plurality of steering-wheels. As shown in the drawings, the wheel 1 is carried upon and rotates a shaft 2. Surrounding this shaft is a sleeve 3, carrying a second wheel 4. The shaft 2 carries a small pinion 5, which meshes with a gear 6. The sleeve 3 carries a larger pinion 7, which meshes with a gear 8. Both gears 6 and 8 are carried by the quadrant 9, to which is attached the depending yoke 10, which is secured to and actuates the steering member 11, illustrated as a rudder-stock. The quadrant 9 is pivoted at 12 to the frame 13. This latter is supported, as shown, in proper relation to the steering member. A bearing 14 for the inner end of the shaft 2 and a bearing 15 for the sleeve and shaft support the two with the pinions in proper position. A collar 16, engaging with the bearing 14, and a collar 17, engaging with the wheel 4, prevent longitudinal movement of the shaft 2. The inner end of the sleeve 3 engages with one face of the pinion 5, preventing endwise movement of the sleeve in one direction, while the engagement of one face of the pinion 7 with the bearing 15 will prevent it in the other direction. The bearing or table 18 is provided to give support to the quadrant and prevent accidental displacement of the gears by the teeth coming out of mesh when the gearing is subjected to severe or unusual strains.

It will be understood from the foregoing description that the two wheels actuate the steering member, each through its own gearing, which is substantially independent of the other.

The speed reduction secured by means of the gearing which comprises the shaft 2, the pinion 5, and gear 6 is considerably different from that secured by the sleeve 3, the pinion 7, and the gear 8. The pinion 7 is so much larger than the pinion 5 that in spite of the increased radius of its engaging gear it will secure a much less reduction—that is to say, it will move the quadrant with proportionally greater speed than the other gearing, which of course will have proportionally more power. This speed reduction is suitably proportioned, so as to secure the proper relation between speed and power. By this explanation it will be seen that the wheel 1 will actuate gearing which will move the quadrant with greater power and less speed than that actuated by the wheel 4. The speed relation between the two gears may be varied as necessity requires, as is obvious.

The wheels 1 and 4 are preferably placed sufficiently close together so that one person can shift his grip from one to the other without losing control of the gear. The vessel or vehicle may be controlled by means of one of the wheels under ordinary circumstances. When increased power or speed is required, the use of the other wheel may be resorted to.

By my invention I secure a gearing for use for speed or for power, wherein the operator can change from one to the other without losing control of the vessel, as is the case where clutches or shifting gears are employed. In practice with former two-speed gears the change is often made only when the high-speed gear no longer serves to keep the vessel in control. There will then be such a severe strain upon the gearing that to change from the high speed to the low speed by shifting gears or clutches will make it extremely liable for the vessel to get beyond the control of the steersman. By my invention this danger is avoided.

In Fig. 3 a modification is illustrated in which the pinion 5 is larger than the pinion 7. In this structure the inner wheel will control the slower and more powerful gear. In this view the pinion 7 is shown as made integral with the sleeve 3, whereby a smaller pinion may be used than if it were separate.

It is obvious that the invention may be applied to a motor-vehicle without substantial change or to different forms of steering-gears.

Having now described my invention, what I claim, and desire to secure by Letters Patent, is—

1. In a steering-gear, the combination with a frame, of a plurality of change-speed gearings thereon, and separate wheels for such gearings, the said gearings differing in the amount of speed reduction.

2. In a steering-gear, the combination in a single structure of means for controlling the steering member, such means comprising gearings, which differ in the amount of speed reduction, and a separate wheel for each gearing.

3. In a steering-gear, the combination with a plurality of wheels, of a steering member, a quadrant controlling the latter, gears on the quadrant, a plurality of pinions engaging with the gears and separate connections between each of the wheels and a pinion, for rotating the latter.

4. In a steering-gear, the combination with a shaft, a wheel thereon and gearing connecting the shaft to the steering member, of a second wheel, a sleeve supporting the wheel and surrounding the shaft, and gearing connecting the steering member to the sleeve, the gearings differing in the amount of speed reduction.

5. A steering-gear, wherein two wheels are connected to the steering member, each through a gearing independently of the others, the several gearings differing in the amount of speed reduction, and the two wheels being sufficiently close together to be actuated by the same person.

This specification signed and witnessed this sixth day of January, 1905.

LEONARD H. DYER.

Witnesses:
JNO. ROBT. TAYLOR,
JOHN S. LOTSCH.